UNITED STATES PATENT OFFICE.

MAX ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 922,282.   Specification of Letters Patent.   Patented May 18, 1909.

Application filed February 12, 1907. Serial No. 357,061.

*To all whom it may concern:*

Be it known that I, MAX ISLER, chemist, a citizen of the Swiss Republic, residing at Mannheim, Germany, have invented new and useful Improvements in Anthracene Dyes and Processes of Making the Same, of which the following is a specification.

I have discovered that by heating anthracene, or a non-oxidized substitution compound thereof, with sulfur with, or without, the addition of a metal, or a metallic oxid, or hydroxid, or salt, or a mixture of any of these compounds, I can obtain new coloring matters which dye vegetable fiber from an alkaline hydrosulfite vat reddish brown to olive-green shades of excellent fastness. By altering the temperature employed and also the metallic compound used, different shades and different intensities can be obtained without the chief characteristics of the coloring matters being altered. For instance, by heating anthracene and sulfur together at a temperature of about 250° C. a product is obtained which, with alkaline hydrosulfite, yields a brown vat and dyes cotton from this vat yellow-brown shades, while, if a temperature of from 350–360° C. be employed the product yields a blue vat and dyes cotton olive-green shades which upon washing turn into brownish olive. If the reaction be carried out in the presence of, for instance, alkali acetate, or carbonate, or hydrate, or sulfid, coloring matters can be obtained which yield duller shades. Among the derivatives of anthracene which can be used according to this invention may be mentioned 9.10.dichlor-anthracene, 2.9.10.trichlor anthracene, dichlor-dibrom-anthracene, dichlor-anthracene-tetrabromid, 2-methyl-anthracene, and 2-anthramin. The two last mentioned compounds yield a redder brown.

Anthraquinone, or any compound containing the anthraquinone grouping that is oxidized derivatives of anthracene cannot be employed for this invention.

The new dyes which I wish to be understood as claiming generically are characterized by the following properties. They are insoluble in water, in alkalies, in dilute acids, and in the ordinary organic solvents, but are soluble in alkaline hydrosulfite solutions yielding from brown to blue solutions which dye unmordanted cotton yielding from green-yellow to brown shades.

The following examples will serve to illustrate further the nature of this invention and the method of carrying it into practical effect, but my invention is not confined to these examples. The parts are by weight.

Example 1: Heat together, at a temperature of two hundred and fifty (250) degrees centigrade, one hundred (100) parts of anthracene (containing from ninety-six (96), to ninety-eight (98), per cent. of pure anthracene) and three hundred (300) parts of sulfur, until the evolution of sulfuretted hydrogen ceases. The product can be used directly for dyeing, or it can be purified by removal of the excess of sulfur by means of sodium sulfid solution. The coloring matter is insoluble in water, in alkalies, in dilute acids, and in the ordinary organic solvents.

Example 2: Heat together, at a temperature of from three hundred and fifty (350), to three hundred and sixty (360), degrees centigrade, one hundred (100) parts of anthracene (containing from ninety-six (96), to ninety-eight (98), per cent. of pure anthracene) and three hundred (300) parts of sulfur, until the evolution of sulfuretted hydrogen ceases. The product can be worked up as described in the foregoing example 1.

Example 3: Heat together, at a temperature of from three hundred and fifty (350), to three hundred and sixty (360), degrees centigrade, one hundred (100) parts of anthracene (containing from ninety-six (96), to ninety-eight (98), per cent. of pure anthracene), three hundred (300) parts of sulfur and seventy-five (75) parts of caustic soda. The product contains, beside the chief coloring matter, a small quantity of a by-product which is soluble in water, the solution being green, and which dyes cotton yielding much less intense shades than those yielded by the chief product. It can be extracted by means of water, or sodium sulfid solution.

In a similar manner, coloring matters can be obtained from anthracene derivatives such as those herein-before named, and instead of caustic soda other metallic hydroxid, or oxid, or salt, or a metal, can be employed.

Now what I claim is:

1. The process of producing coloring matter by heating anthracene or a compound containing the anthracene grouping with sulfur.

2. The process of producing coloring matter by heating anthracene or a compound containing the anthracene grouping with sulfur in the presence of a metallic compound.

3. The process of producing coloring matter by heating anthracene with sulfur in the presence of caustic soda.

4. The process of producing coloring matter by heating 9.10-dichloranthracene with sulfur in the presence of caustic soda.

5. As new articles of manufacture the coloring matters such as can be obtained from a compound containing the anthracene grouping which coloring matters are insoluble in water, in alkalies, in dilute acids and in the ordinary organic solvents, but are soluble in alkaline hydrosulfite solutions yielding from brown to blue solutions which dye unmordanted cotton yielding from green-yellow to brown shades.

6. As a new article of manufacture the coloring matter which can be obtained from anthracene which coloring matter is insoluble in water, in alkalies, in dilute acids, and in the ordinary organic solvents, but is soluble in alkaline hydrosulfite solution yielding a blue vat which dyes unmordanted cotton greenish olive shades.

In testimony whereof I have hereunto set my hand in the presence of two subscribing witnesses.

MAX ISLER.

Witnesses:
T. ALEC. LLOYD,
H. W. HARRIS.